(12) United States Patent
Stabenow

(10) Patent No.: US 10,961,999 B2
(45) Date of Patent: Mar. 30, 2021

(54) METHOD FOR OPERATING A PRESSURE CONTROL SYSTEM COMPRISING A MULTI-STAGE COMPRESSOR, AND PRESSURE CONTROL SYSTEM

(71) Applicant: WABCO GmbH, Hannover (DE)

(72) Inventor: Uwe Stabenow, Laatzen (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 16/605,013

(22) PCT Filed: Apr. 12, 2018

(86) PCT No.: PCT/EP2018/059364
§ 371 (c)(1),
(2) Date: Oct. 14, 2019

(87) PCT Pub. No.: WO2018/202397
PCT Pub. Date: Nov. 8, 2018

(65) Prior Publication Data
US 2020/0158104 A1    May 21, 2020

(30) Foreign Application Priority Data

May 5, 2017 (DE) ...................... 10 2017 004 369.8

(51) Int. Cl.
*F04B 49/08* (2006.01)
*B60G 17/052* (2006.01)
(Continued)

(52) U.S. Cl.
CPC .......... *F04B 49/08* (2013.01); *B60G 17/0525* (2013.01); *F04B 25/005* (2013.01); *F04B 49/106* (2013.01); *F04B 49/22* (2013.01)

(58) Field of Classification Search
CPC .... F04B 49/08; F04B 41/06; B60G 2202/154; B60G 2500/205
See application file for complete search history.

(56) References Cited

U.S. PATENT DOCUMENTS 7,881,840 B2* 2/2011 Rehra ............... B60G 17/052
701/37
9,938,981 B2* 4/2018 Hein ............... B60G 17/0528
(Continued)

FOREIGN PATENT DOCUMENTS

DE          10321771 A1   12/2004
DE      102008023594 A1   11/2009
(Continued)

Primary Examiner — Thomas E Lazo
(74) Attorney, Agent, or Firm — Leydig, Voit & Mayer, Ltd.

(57) ABSTRACT

A method for operating a pressure control system having a multi-stage compressor includes providing a multiply compressed pressure medium by the multi-stage compressor for filling a pressure medium reservoir or pressure medium chambers of the pressure control system. Providing the multiply compressed pressure medium includes (i) providing, by a first compression stage, a pre-compressed pressure medium and additionally compressing, at least by a second compression stage, the pre-compressed pressure medium, and/or (ii) introducing an already-compressed charging pressure medium into an intermediate volume between the first compression stage and the second compression stage of the multi-stage compressor and further compressing the charging pressure medium at least by the second compression stage. The charging pressure medium simultaneously passes via a control line to a control input of a shut-off valve that interacts with the first compression stage, such that a charging pressure of the charging pressure medium predefines a control pressure.

21 Claims, 5 Drawing Sheets

(51) Int. Cl.
 F04B 25/00 (2006.01)
 F04B 49/10 (2006.01)
 F04B 49/22 (2006.01)

(56) References Cited

U.S. PATENT DOCUMENTS

| | | |
|---|---|---|
| 2004/0228737 A1 | 11/2004 | Folchert |
| 2009/0079155 A1* | 3/2009 | Rehra .................. B60G 17/052 280/124.16 |
| 2013/0255240 A1* | 10/2013 | Bergemann ........... F15B 21/048 60/327 |
| 2013/0320645 A1 | 12/2013 | Gall |
| 2014/0059876 A1 | 3/2014 | Folchert et al. |
| 2014/0241859 A1 | 8/2014 | Hein |

FOREIGN PATENT DOCUMENTS

| | | | |
|---|---|---|---|
| DE | 102008034240 A1 * | 1/2010 | ......... B60G 17/0523 |
| DE | 102011084666 A1 | 8/2012 | |
| DE | 102011083614 A1 | 9/2012 | |
| DE | 102011084921 A1 | 4/2013 | |
| DE | 102012005303 A1 | 6/2013 | |
| DE | 102012006382 A1 | 10/2013 | |
| DE | 102012010390 A1 | 12/2013 | |
| DE | 102008034240 B4 | 12/2014 | |
| DE | 102014012646 A1 | 2/2016 | |

\* cited by examiner

METHOD FOR OPERATING A PRESSURE CONTROL SYSTEM COMPRISING A MULTI-STAGE COMPRESSOR, AND PRESSURE CONTROL SYSTEM

CROSS REFERENCE TO RELATED APPLICATIONS

This application is a U.S. National Phase Application under 35 U.S.C. § 371 of International Application No. PCT/EP2018/059364, filed on Apr. 12, 2018, and claims benefit to German Patent Application No. DE 10 2017 004 369.8, filed on May 5, 2017. The International Application was published in German on Nov. 8, 2018 as WO 2018/202397 under PCT Article 21(2).

FIELD

The invention relates to a method for operating a pressure control system having a multi-stage compressor, in particular in a utility vehicle, and to a pressure control system having a multi-stage compressor.

BACKGROUND

Multi-stage compressors serve for achieving a high level of compression of a pressure medium, in particular of a gas, for example air, by virtue of the pressure medium, which has been pre-compressed in a first compression stage, being additionally compressed in a subsequent second compression stage. It is also possible for further compression stages to be provided in a cascade, in which, in each case, the pressure medium compressed by the preceding compression stage is compressed further.

If consumers, for example of an air suspension system or of a ride-height control system in a vehicle, are to be supplied with the pressure medium, a multi-stage compressor of said type can be used in order to provide the pressure medium with a corresponding pressure for the supply to pressure springs. Here, the multi-stage compressor compresses the pressure medium, which is introduced from the atmosphere into an intake space, by means of two or more compression stages, and transfers the pressure medium that has been compressed in multi-stage fashion to the pressure springs. Alternatively, an already-compressed pressure medium from a pressure medium reservoir may be used, which is compressed once more by the compressor.

This is described for example in DE 10 2008 034 240 B4, according to which a ride-height control system is provided in the case of which a multi-stage compressor is used in order to convey the pressure medium from the atmosphere or out of a pressure medium reservoir, wherein two compression stages are provided. If pressure medium from the atmosphere is compressed, the pressure medium is conducted through both compression stages, whereas, in the case of delivery of the pressure medium out of the pressure medium reservoir, a compression of the pressure medium fed to the consumer is performed only by means of the second compression stage. In order, in this case, to reduce or inhibit the compression work of the first compression stage, a shut-off valve designed as a 2/2 directional valve is provided, which, in the case of conveyance out of the pressure medium reservoir, prevents a conveyance of compressed pressure medium out of the first compression stage to the second compression stage. The shut-off valve is in this case actuated electrically by means of a control device.

DE 103 21 771 A1 describes a multi-stage compressor in the case of which, for the deactivation of the first compression stage, a bypass line with a pneumatically controllable shut-off valve is provided, which connects an intake space of the compressor to the first compression space. The pneumatic shut-off valve is in this case opened in a manner dependent on the pressure in the intake space, such that a pressure equalization can occur between the intake space and the compression space. This serves for deactivating the first compression stage in a manner dependent on the pressure of the pressure medium admitted into the intake space. In this way, in a manner dependent on the admitted pressure medium, a high level of compression can be achieved with a small volume flow in single-stage operation. By contrast, in two-stage operation, a high volume flow is realized, and the pressure medium flows through two compression stages.

In DE 10 2011 083 614 A1, provision is made, in an open operating mode, for air to be compressed by means of two compression stages, and for the compressed air to be fed to a pressure medium reservoir. In a closed operating mode, the already-compressed air from the pressure medium reservoir can be admitted into an intermediate volume between the first and the second compression stage and compressed again by means of one of the compression stages in order to subsequently pass into the consumers. A return of air from the consumers into the pressure medium reservoir is also provided. For control purposes, electrically actuated switchover valves are provided, which correspondingly shut off and open up the flow paths for the compressed air or the air to be compressed.

DE 10 2012 010 390 A1 describes a ride-height control system in the case of which, in a closed operating mode, air that has already been compressed by means of a compressor is fed from a pressure reservoir into consumers designed as spring struts. For the control of the pressure in the ride-height control system, a pressure-limiting function is provided, which is configured either in the form of a discharge valve or in the form of a pilot control valve, which each discharge air into the atmosphere in the presence of an excessively high pressure in the system.

SUMMARY

In an embodiment, the present invention provides a method for operating a pressure control system having a multi-stage compressor. The method comprises providing a multiply compressed pressure medium by the multi-stage compressor for filling a pressure medium reservoir or pressure medium chambers of the pressure control system. Providing the multiply compressed pressure medium includes (i) providing, by a first compression stage, a pre-compressed pressure medium and additionally compressing, at least by a second compression stage, the pre-compressed pressure medium, and/or (ii) introducing an already-compressed charging pressure medium into an intermediate volume between the first compression stage and the second compression stage of the multi-stage compressor and further compressing the charging pressure medium at least by the second compression stage. The charging pressure medium simultaneously passes via a control line to a control input of a shut-off valve that interacts with the first compression stage, such that a charging pressure of the charging pressure medium predefines a control pressure of the shut-off valve. By the shut-off valve, a pressure limitation and/or volume flow limitation, dependent on the control pressure, of the pre-compressed pressure medium conveyed by the first compression stage into the intermediate volume is realized for the purposes of automatically adapting the compression power of the first compression stage by the charging pressure medium situated in the control line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
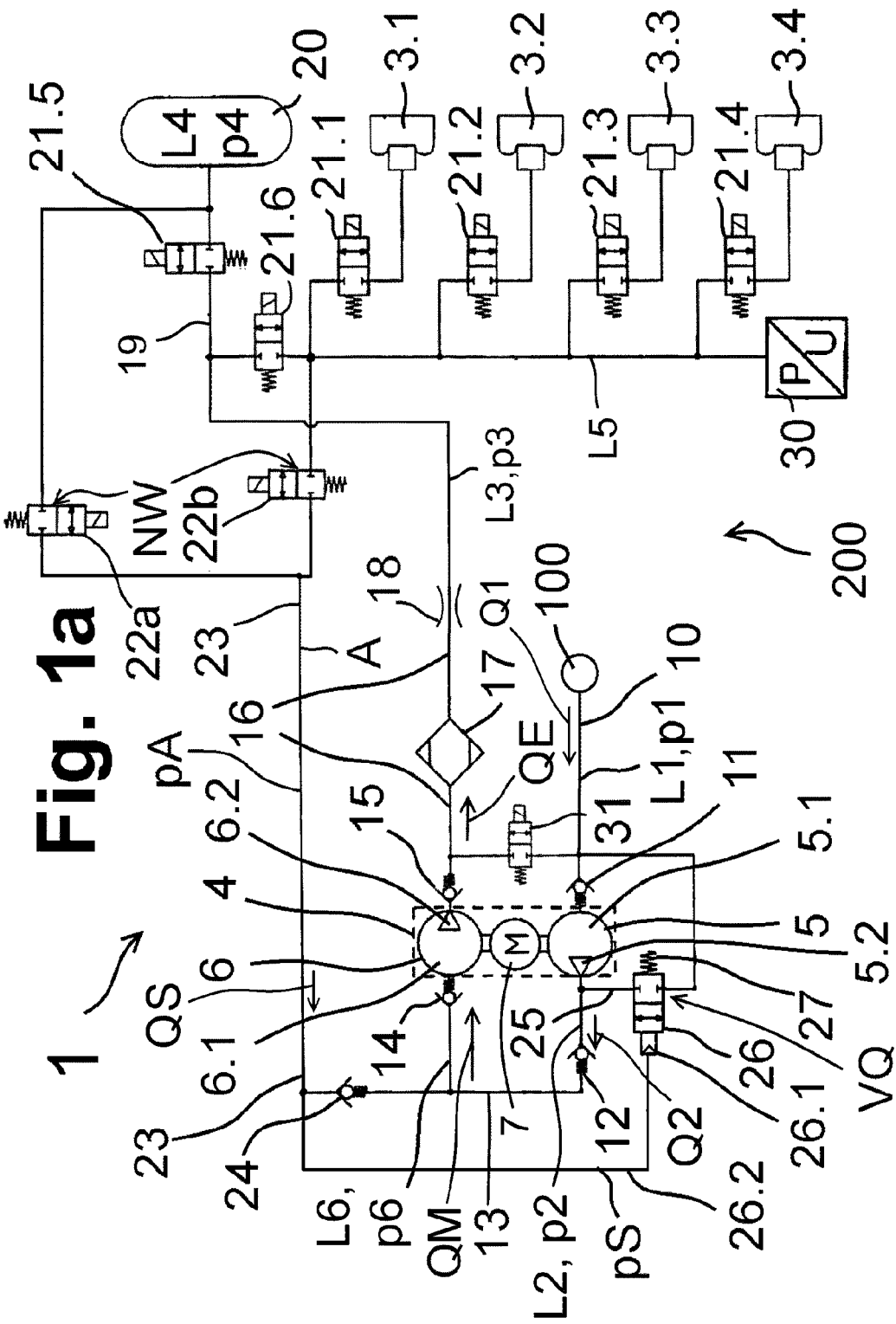
FIGS. 1a, b, and c show air suspension systems having a two-stage compressor according to different embodiments.

The invention provides methods for operating a pressure control system having a multi-stage compressor, which, in a simple and reliable manner, adapt a compression power and a compressed volume flow of the multi-stage compressor to the operating modes of the pressure control system. The invention further provides pressure control systems having a multi-stage compressor.

Accordingly, provision is made according to the invention whereby a compression power of a first compression stage of a multi-stage compressor, in particular in a closed operating mode of a pressure control system, in particular of an air suspension system in a vehicle, is reduced or restricted—in particular restricted to a minimum—by means of a pneumatically controlled shut-off valve in a manner dependent on a control pressure prevailing in a control line. The reduction or the limitation of the compression power can be performed according to the invention by means of a pressure limitation and/or volume flow limitation, controlled by the shut-off valve, of a pre-compressed pressure medium that is conveyed by means of the first compression stage, wherein, in the case of a maximum restriction, a pressure limitation to 0 bar absolute, or a volume flow limitation to a through-flow rate of zero out of the first compression stage, is realized. That is to say, a minimum is to be understood to mean a maximum restriction or a complete deactivation of the first compression stage; the first compression stage thus no longer contributes to an overall compression power of the multi-stage compressor in particular in the closed operating mode, such that the fraction of the energy consumption of the multi-stage compressor arising from the first compression stage is minimized only to friction losses.

In this way, it is already possible to achieve the advantage that the compression power of the first compression stage can, in the event of a switchover into the closed operating mode of the pressure control system that is operated with the multi-stage compressor, be easily and reliably adapted in self-regulating and/or automatic fashion. Because a pneumatic actuation of the shut-off valve is performed, no further electronics are required to effect the switchover.

Here, "first compression stage" does not imperatively mean that compression stage which, in the multi-stage compressor, is situated at the start in a flow direction. Rather, it is to be understood to mean that the first compression stage may be any compression stage in the multi-stage compressor which is followed by at least one further compression stage—a second compression stage—wherein the second compression stage need not imperatively directly adjoin the first compression stage. The second compression stage is thus defined as being situated anywhere downstream of the first compression stage in a flow direction, wherein, here, the second compression stage is not imperatively to be regarded as the final compression stage of the multi-stage compressor.

In an open operating mode of the pressure control system, pressure medium, for example intake air from the atmosphere provided via an intake line, is pre-compressed by the multi-stage compressor by the first compression stage, for example to an intermediate pressure of 5-6 bar in the case of a stabilization pressure of the first compression stage of for example 10-15 bar, and introduced into an intermediate volume. From there, the pre-compressed air passes into a second compression stage, in which said air is compressed further, for example to a final pressure of 20 bar, and from which said air passes via an air dryer into one or more consumers, for example air springs of the pressure control system, and/or into a pressure medium reservoir. The overall compression power in the open operating mode is thus determined by both compression stages.

The closed operating mode is set in particular if it is sought to supply the consumers of the pressure control system with highly compressed and/or dried pressure medium. This is the case in particular if rapid charging of the consumers with pressure is desired, for example if fast control is required through the provision of a high final volume flow, that is to say a high quantity of air per unit of time out of the second or final compression stage, by means of the air suspension controller. Furthermore, the closed operating mode may be set if it is sought for pressure medium to be returned from the consumers into the pressure medium reservoir, because re-compression must be ensured in that situation also.

For the switchover from the open operating mode into the closed operating mode, it is for example the case that a switching valve that connects the pressure medium reservoir or the consumers to the store line is opened, such that already-compressed pressure medium, hereinafter referred to as charging pressure medium, can flow into the store line. The charging pressure medium may on the one hand be the pressure medium stored in the pressure medium reservoir, which has already been compressed to a reservoir pressure. By contrast, if, in the closed operating mode, it is sought for already-compressed pressure medium to be returned from the consumers into the pressure medium reservoir, then the pressure medium from the consumers is the charging pressure medium that is admitted into the store line. For this purpose, for the consumers and the pressure medium reservoir, two separate switching valves may be provided, which control the inflow into the store line.

According to the invention, the charging pressure medium can pass, via the store line, into the intermediate volume between the first and the second compression stage and simultaneously, for example via a control line which branches off from the store line, to a control input of the pneumatically controlled shut-off valve. Thus, approximately the same pressure prevails in the intermediate volume and at the control input, which pressure is slightly lower than the reservoir pressure in the pressure medium reservoir or the pressure in the consumers, because the pressures fall as a result of the flow through the switching valve and the store line. In the closed operating mode, the already highly compressed charging pressure medium can thus be additionally compressed by means of the second compression stage.

A store volume flow of the already-compressed charging pressure medium that is admitted into the store line, that is to say a quantity of air per unit of time to the intermediate volume, is in this case in particular dependent on a nominal diameter of the switching valve and possibly further upstream valves through which the charging pressure medium flows. The store volume flow in turn also determines the final volume flow of the pressure medium conveyed by means of the second compression stage. As a result of the saving of energy in the first compression stage, both volume flows can be configured to be higher:

By virtue of the fact that the compression power and thus also the energy consumption of a motor of the multi-stage compressor of the first compression stage are reduced in the closed operating mode, this excess energy can, up to an acceptable maximum energy limit, in particular a current limit of for example 35 A, be additionally used for operating the second compression stage. For this purpose, it is for example possible for the nominal diameter of the switching valve and thus the store volume flow to be configured to be higher, without exceeding the acceptable maximum energy limit. Consequently, an effective power of the pressure control system increases, because, with the same acceptable electrical power, a considerably increased final volume flow can be ensured by means of the second compression stage with the same energy usage.

As soon as the charging pressure medium is admitted into the intermediate volume in the closed operating mode, the first compression stage seeks to provide a pre-compressed pressure medium which has been compressed to the charging pressure of the charging pressure medium that then prevails in the intermediate volume. This can be automatically prevented, according to the invention, through the release of the charging pressure medium, because, via the control line, the shut-off valve is automatically also actuated. Said shut-off valve then, depending on the control pressure, immediately switches over and effects a reduction or deactivation of the compression power of the first compression stage. In the preferred case, the compression power of the first compression stage is completely deactivated, that is to say the compression power of the first compression stage is restricted to the value zero.

If the compression power of the first compression stage is not completely deactivated but merely reduced in the closed operating mode, then a mixture of the pressure medium pre-compressed by the first compression stage and of the respective charging pressure medium from the store line is situated in the intermediate volume. Thus, in that situation, a mixed pressure medium with a mixed volume flow and a mixed pressure, which are made up of the respective volume flows and pressures, is conveyed out of the intermediate volume into the second compression stage.

Upon the setting of the closed operating mode, the shut-off valve opens in a manner dependent on the control pressure, and the pressure medium that has been pre-compressed in the first compression stage is partially or completely—depending on the degree to which the compression power of the first compression stage is restricted—diverted out of a first compression space of the first compression stage via a ventilation line into the atmosphere or into the intake line, in order to achieve a pressure limitation and/or a volume flow limitation. In this way, it is effected, according to the invention, that, in the closed operating mode, the pre-compressed pressure medium passes only to a set degree, that is to say up to a particular limit pressure of for example 0 bar or 1 bar or a particular limit volume flow, out of the first compression stage into the intermediate volume. In the case of a complete deactivation (restriction to zero) of the first compression stage, no pre-compressed pressure medium passes into the intermediate volume.

In the open operating mode, the control pressure at the shut-off valve lies below an opening pressure of the shut-off valve above which the shut-off valve opens, such that the shut-off valve remains closed and the pre-compressed air passes entirely into the intermediate volume. Thus, the operation of the pressure control system is advantageously not influenced by the additional shut-off valve in the open operating mode.

By means of the return, controlled by the shut-off valve, of the pressure medium that has been pre-compressed in the first compression stage into the ventilation line, it is thus ensured that, by contrast to the open operating mode, none or only some of the pressure medium that has been compressed by means of the first compression stage is conveyed by means of said first compression stage into the intermediate volume. The first compression stage thus no longer contributes, or only proportionally contributes, to the overall compression power of the compressor.

The main part of the overall compression power in the closed operating mode is thus achieved by means of a compression of the charging pressure medium that is admitted from the store line into the intermediate volume and not conveyed by means of the first compression stage. An inflow of the charging pressure medium out of the intermediate volume into the first compression stage is prevented by means of a first outlet valve in the first compression stage, for example a check valve which opens toward the intermediate volume. Thus, no pressure equalization takes place between the intermediate volume and the first compression space of the first compression stage.

In this way, the compression power of the first compression stage is advantageously automatically restricted in the closed operating mode, because the first compression stage does not compress the pressure medium to the intermediate pressure of the charging pressure medium prevailing in the intermediate volume. The power consumption of the first compression stage can thus be limited, wherein said power consumption is, in the case of a complete deactivation, restricted substantially to the friction losses. The drive power of a motor of the compressor is thus reduced, and the energy demand falls and can thus, in the closed operating mode, be adapted primarily to the operation of the second or further compression stages and thus of the final volume flow. Furthermore, a pressure medium that has attained a high level of dryness can be fed to the consumers or to the pressure medium reservoir, because the fraction of non-dried pressure medium, which is conveyed substantially out of the first compression stage and thus out of the atmosphere, is reduced.

By virtue of the fact that the actuation of the shut-off valve can, according to the invention, be performed pneumatically and, here, is directly coupled to the release of the charging pressure medium from the pressure medium reservoir or from the consumers into the intermediate volume, the switchover takes place without additional outlay and time losses. Since the charging pressure medium is not introduced by means of the first compression stage into the multi-stage compressor, a simple construction and operation of the pressure control system can be achieved, because the non-compressed pressure medium in the open operating mode and the charging pressure medium in the closed operating mode are introduced at different locations into the multi-stage compressor, and thus no switchover of the pressure medium source of the first compression stage is necessary.

In order to prevent undesired opening of the shut-off valve in the open operating mode, provision is made, according to a first embodiment, for the opening pressure of the shut-off valve to be adapted to the maximum compression power of the first compression stage and thus to a maximum intermediate pressure that can be achieved by means of the first compression stage taking into consideration a minimum possible charging pressure of the charging pressure medium. Through the corresponding setting of the opening pressure, a shut-off function is thus generated for the open operating mode, by means of which a switching of the shut-off valve by means of the pressure medium pre-compressed by the first compression stage is prevented. The pressure control system or the multi-stage compressor must in this case be correspondingly adapted to the opening pressure such that said opening pressure is not attained by the first compression stage in the open operating mode. For example, if the maximum admissible final pressure of the pressure control system is 20 bar, a maximum intermediate pressure of approximately 4.5 bar is reached, such that an opening pressure of the shut-off valve of for example 5 bar can be set, which approximately also corresponds to the minimum charging pressure of the charging pressure medium.

In this case, in the open operating mode, the shut-off valve remains closed in the presence of an intermediate pressure of 4.5 bar, and the multi-stage compressor conveys compressed pressure medium out of the second compression stage with a final pressure of approximately 20 bar. In the closed operating mode, the intermediate pressure, and thus also the control pressure at the shut-off valve, increases to over 5 bar, the shut-off valve opens, the compression power of the first compression stage is reduced, and, owing to the re-compression of the charging pressure medium, a high final pressure can be achieved by means of the second compression stage, which final pressure can be fed to the consumers or to the pressure medium reservoir. Thus, it is easily possible for an undesired opening of the shut-off valve in the open operating mode to be achieved without additional components merely by means of a corresponding adaptation of parameters of the pressure control system.

In an alternative embodiment, to generate the shut-off function, an additional valve is provided between the control line and the intermediate volume, which additional valve may be formed for example as an overpressure valve, in particular as a check valve, or as a pneumatic control valve. The additional valve blocks the passage of the pressure medium pre-compressed by the first compression stage out of the intermediate volume in the direction of the shut-off valve. In this way, it is easily possible to prevent an alternative shut-off action of the first compression stage in the open operating mode, wherein, through the provision of an additional valve, the first compression stage can also convey pressure medium at an intermediate pressure higher than the opening pressure of the shut-off valve. An adaptation of the parameters of the pressure control system is therefore not imperatively necessary.

The shut-off valve may be designed as a pneumatically actuated 2/2 directional valve with a spring, wherein the spring transfers the directional valve into its closed position as soon as the control pressure falls below the opening pressure of for example 5 bar. If an overpressure valve is provided as additional valve in order to prevent an inadvertent opening of the shut-off valve in the open operating mode, the opening pressure may also amount to less than 5 bar, because, other than in the closed operating mode, the control line is unpressurized. If the control pressure is higher than the opening pressure, the shut-off valve is completely opened. In its open position, the shut-off valve connects the first compression space to the ventilation line, wherein, in a manner dependent on a valve cross section of the shut-off valve, the pressure medium pre-compressed in the first compression stage is diverted entirely into the ventilation line or passes proportionally into the ventilation line and proportionally via the first outlet valve into the intermediate volume, such that a deactivation or a restriction of the compression power of the first compression stage is achieved.

It is advantageously possible with a pneumatic shut-off valve of said type to realize a simple and inexpensive construction of the pressure control system, with which the efficiency of the compressor can be optimally coordinated, that is to say a high store volume flow by means of an increase of the nominal diameter in particular of the switching valve, with a simultaneously settable maximum energy consumption and a dried pressure medium. Without this design, the energy in the system would be increased, and additionally a drying level in the system would be incalculable. If only fully closed operation were achieved by completely deactivating the first compression stage, positive physical control is realized with regard to drying level and energy consumption, and energy preservation in the system.

In an alternative embodiment, it is also possible for a pneumatically controlled proportional valve to be used as shut-off valve. Said valve opens, in accordance with the level of the prevailing control pressure, in continuous or stepped fashion proceeding from the opening pressure, such that the compression power of the first compression stage can be coordinated in variable fashion. Thus, in an intermediate position of the shut-off valve that is dependent on the control pressure, the pressure medium that has been pre-compressed in the first compression stage is proportionally returned out of the first compression space into the intake line or the atmosphere, wherein the proportion is dependent on the prevailing control pressure. The remaining proportion of the pressure medium is conveyed by the first compression stage into the intermediate volume.

In this way, it is advantageously possible to achieve a variable reduction in the compression power of the first compression stage, which is dependent on the charging pressure of the charging pressure medium. If, for example, a charging pressure medium with a high charging pressure is present, that is to say a high level of compression, the compression power of the first compression stage in the closed operating mode can be reduced to a greater degree or even deactivated, and, in the presence of a low charging pressure, a higher compression power can be set in an assisting manner by means of the first compression stage. In this way, in both cases, the overall compression power and the efficiency of the compressor can be optimally adapted to the actually prevailing conditions by virtue of the pressure limitation and/or the volume flow limitation being set correspondingly by means of the shut-off valve.

In particular, this may occur in a manner dependent on the predefined energy consumption, that is to say the upper energy limit. The pneumatic shut-off valve is then designed such that the first compression stage is used for compression until such time as a set upper energy limit for the compressor has been reached. If the upper current limit is overshot, the shut-off valve automatically switches over, such that the power consumption of the first compression stage is reduced, and the current consumption lies within the limit values again. In this way, the final volume flow provided by the second compression stage and the overall compression power are, with simultaneous adherence to the energy specifications, optimally coordinated with one another in the closed operating mode. Said coordination is possible both for a pneumatic directional valve and for a proportional valve.

The optimum operation of the pressure control system is thus achieved, for the closed operating mode, by means of an optimally configured second compression stage, which is filled by the maximum store volume flow, which is defined in particular by the nominal diameter of the switching valve, and the deactivated or reduced first compression stage, to the power limit of the multi-stage compressor or the upper energy limit. Additionally, for safety, an additional pressure-limiting valve may be provided in the store line, which additional pressure-limiting valve sets a maximum charging pressure in the store line, wherein the maximum charging pressure may be selected in a manner dependent on the maximum energy limitation, such that the second compression stage is not operated beyond its power limit or the power limit of its drive. Additionally, the construction of the second compression stage of the multi-stage compressor may also be adapted, for example by virtue of a piston which serves for the compression in the second compression stage being configured to be larger.

Additionally, as a shut-off valve, a 3/2 directional valve or 3/2 proportional valve may be provided, such that ventilation of the store line is advantageously also possible in the open operating mode.

According to the invention, the multi-stage compressor can be designed as a piston compressor, wherein a first compression stage is formed by a first piston, and the second compression stage by a second piston, which compression stages are connected to one another by the intermediate volume, wherein further compression stages with further pistons may also be present. All pistons are moved by one motor via a piston drive so as to compress the pressure medium successively in the corresponding compression space. The compressor stages have different compression volumes in order to be able to realize a pre-compression by means of the first compression stage and an additional compression by means of the second compression stage, and a further compression by means of possible further compression stages. The piston compressor is part of a pressure control system which, by means of a compression of air as pressure medium, supplies compressed air to multiple springs in order to realize, for example, suspension or a raising and lowering of a part of the vehicle, wherein this may be performed in a closed or an open operating mode.

The shut-off valve and the associated transmission lines for the pneumatic and self-regulating coordination of the compressor in the closed operating mode can advantageously be installed in a space-saving manner in a compressor casing, for example in a compressor cover. In this way, space and weight can be saved, and it is furthermore possible to realize a simple construction with short pneumatic transmission paths and thus low pressure losses. Easy retrofittability of the additional pneumatic components in a conventional multi-stage compressor is furthermore advantageously possible.

In each of FIGS. 1a, b, c, a pressure control system, for example an air suspension system 1, is provided, which has four pressure medium chambers 3.1, 3.2, 3.3, 3.4, which are assigned in each case to one consumer, for example air springs of a vehicle 200. The pressure medium chambers 3.i are supplied with a compressed pressure medium L3, for example air, wherein the compressed pressure medium L3 is compressed in a two-stage compressor 4, for example a piston compressor illustrated in FIG. 2.

For this purpose, the two-stage compressor 4 has a first compression stage 5 and a second compression stage 6, which each have an intake space 5.1, 6.1 and a compression space 5.2, 6.2, wherein the pressure medium L1, L6 that flows into the respective intake space 5.1, 6.1 is compressed in the compression space 5.2, 6.2. The compression stages 5, 6 are driven by a motor 7, which has the effect that a piston 8, 9 situated in the respective compression stage 5, 6 moves upward and downward, and the pressure medium L1, L6 provided in the intake space 5.1, 6.1 is thus correspondingly compressed.

In this embodiment, the pressure control system 1 can be operated in two operating modes, an open operating mode BMo (open mode) and a closed operating mode BMc (closed mode), in each of which air is conveyed and compressed as pressure medium L1, L2, L3, L4, L5, L6. In the open operating mode BMo, intake air L1 from the atmosphere 100, that is to say at an air pressure or intake pressure p1 of approximately 1 bar and with an intake volume flow Q1, is introduced via an intake line 10 and a first inlet valve 11 into the first intake space 5.1 of the first compression stage 5. The intake air L1 is subsequently initially pre-compressed by means of the first piston 8 (see FIG. 2) and, in the process, conducted into the first compression space 5.2. From the first compression space 5.2, the pre-compressed air L2 flows at an intermediate pressure p2 and with an intermediate volume flow Q2 via a first outlet valve 12, for example a check valve, into an intermediate volume 13.

From the intermediate volume 13, the pre-compressed air L2 passes via a second inlet valve 14 into the second intake space 6.1 of the second compression stage 6, from which the pre-compressed air L2 is compressed further by means of a second piston 9 (see FIG. 2) and introduced into the second compression space 6.2. From the second compression stage 6, the compressed air L3 passes at a final pressure p3 via a second outlet valve 15 into an outlet line 16 to an air dryer 17 and a nozzle 18. Subsequently, the outlet line 16 conducts the compressed air L3 to the pressure medium chambers 3.1, 3.2, 3.3, 3.4 of the connected consumers, for example of the air springs, and via a reservoir line 19 to a pressure medium reservoir 20, in which the compressed air L3 is stored as stored air L4 at a reservoir pressure p4 which, owing to losses, is slightly lower than the final pressure p3.

The pressure medium reservoir 20 and the pressure medium chambers 3.1, 3.2, 3.3, 3.4 are in each case connectable by means of a controllable valve 21.1, 21.2, 21.3, 21.4, 21.5, 21.6, for example a 2/2 solenoid valve, to the outlet line 16 or the reservoir line 19, such that, depending on the position of the controllable valves 21.i, the compressed air L3 can flow into the pressure medium chambers 3.1, 3.2, 3.3, 3.4 for the control of the consumers or into the pressure medium reservoir 20.

Accordingly, the compressed air L3 is conducted into the first pressure medium chamber 3.1 when the sixth valve 21.6 is open and the first valve 21.1 is open, into the second pressure medium chamber 3.2 when the second valve 21.2 is open, into the third pressure medium chamber 3.3 when the third valve 21.3 is open, and into the fourth pressure medium chamber 3.4 when the fourth valve 21.4 is open, wherein then the fifth valve 21.5 is closed and thus no compressed air L3 can flow into the pressure medium reservoir 20.

On the other hand, if the valves 21.1, 21.2, 21.3, 21.4, 21.6 are in the closed position and the fifth valve 21.5 is open, compressed air L3 that has been dried by means of the air dryer 17 can be introduced into the pressure medium reservoir 20 and stored therein. Pressure monitoring is possible by means of a pressure measuring unit 30. By means of an additional discharge valve 31, the compressed air L3 can be discharged into the atmosphere 100.

The air L4 stored in the pressure medium reservoir 20 can, in the closed operating mode BMc, be admitted as charging pressure medium A into the intermediate volume 13, such that the already-compressed air L4 is compressed once more. For this purpose, in this embodiment, the fifth valve 21.5 is closed, and a first switching valve 22a, which is arranged in a store line 23 that branches off between the fifth valve 21.5 and the pressure medium reservoir 20, is opened. In the embodiment in FIGS. 1a and 1b, the store line 23 is connected via an additional valve 24, for example a shut-off valve, in particular a check valve, or a pneumatic directional valve, to the intermediate volume 13, such that, in the opened position of the first switching valve 22a, the stored air L4 can flow into the intermediate volume 13 and into the second intake space 6.1, in order to be compressed again by the second compression stage 6. An inflow of the stored air L4 into the first compression stage 5 is prevented by the first outlet valve 12, which closes in this direction.

If, in the closed operating mode BMc, a return of chamber air L5 from the pressure medium chambers 3.i into the pressure medium reservoir 20 is desired, then the valve 21.i (where i=1 . . . 4) assigned to the respective pressure medium chamber 3.i and a second switching valve 22b are opened, and the sixth valve 21.6 is closed, such that the chamber air L5 is admitted as charging pressure medium A into the store line 23. The first switching valve 22a is in this case likewise closed, and the fifth valve 21.5 is opened, in order to permit a return into the pressure medium reservoir 20. If only a compression of stored air L4 is provided in the pressure control system 1, the path via the second switching valve 22b may also be omitted.

A nominal diameter NW of the switching valves 22a, 22b is in this case selected to be for example between 1 mm and 4 mm, such that a high store volume flow QS into the intermediate volume 13 can be set.

Since, in the closed operating mode BMc, the first compression stage 5 is not imperatively required for the pre-compression, because a (pre-)compressed charging pressure medium A is already introduced via the store line 23 into the intermediate volume 13, the compression power of the first compression stage 5 is restricted, in particular deactivated, which is to be understood to mean that air L2 pre-compressed by the first compression stage 5 is not entirely conveyed or—preferably—is not conveyed out of the first compression space 5.2 through the first outlet valve 12 into the intermediate volume 13. That is to say, a pressure limitation and/or a volume flow limitation of the pre-compressed pressure medium L2 conveyed into the intermediate volume 13 to a limit pressure pG or limit volume flow QG set by means of a shut-off valve 26 is achieved.

For this purpose, a ventilation line 25 branches off between the first outlet valve 12 and the first compression space 5.2, which ventilation line opens either into the intake line 10 or into the atmosphere 100. Arranged in the ventilation line 25 is a shut-off valve 26, which has a pneumatic control input 26.1, which is connected to a control line 26.2, wherein, in this embodiment, the control line 26.2 branches off from the store line 23, such that the charging pressure medium A is admitted into the control line 26.2, and thus a charging pressure pA of the charging pressure medium A prevailing in the control line 26.2 prevails at the control input 26.1. The shut-off valve 26 is switched in a manner dependent on a control pressure pS, which, in the case of an opened first switching valve 22a or second switching valve 22b, approximately corresponds to the charging pressure pA of the respective charging pressure medium A prevailing at the control input 26.1.

Thus, as soon as the respective switching valve 22a, 22b is opened in order to activate the closed operating mode BMc and operate the air suspension system 1 with the stored air L4 or return the consumer air L5, the compression power of the first compression stage 5 is automatically restricted or deactivated by means of the shut-off valve 26. For this purpose, the pneumatic control pressure pS prevailing at the control input 26.1 switches over the shut-off valve 26 such that pre-compressed air L2 present in the first compression space 5.2 is at least proportionally returned into the intake line 10 or optionally into the atmosphere 100, such that no or less pre-compressed air L2, that is to say pre-compressed air L2 up to a limit pressure pG or up to a limit volume flow QG, is conveyed through the first outlet valve 12 into the intermediate volume 13. A compression takes place primarily—in particular exclusively—by means of the second compression stage 6 in order to supply the pressure medium chambers 3.i with air or to realize a return into the pressure medium reservoir 20.

In a first embodiment, the shut-off valve 26 is in the form of a pneumatic 2/2 directional valve with a spring 27. Accordingly, the pneumatic control valve opens up the ventilation line 25 as soon as a set control pressure pS is overshot, which fully opens the shut-off valve 26 counter to the force of the spring 27. If the control pressure pS is too low, in particular lower than an opening pressure p0 of the shut-off valve 26, the shut-off valve 26 closes completely.

Figure 1B:
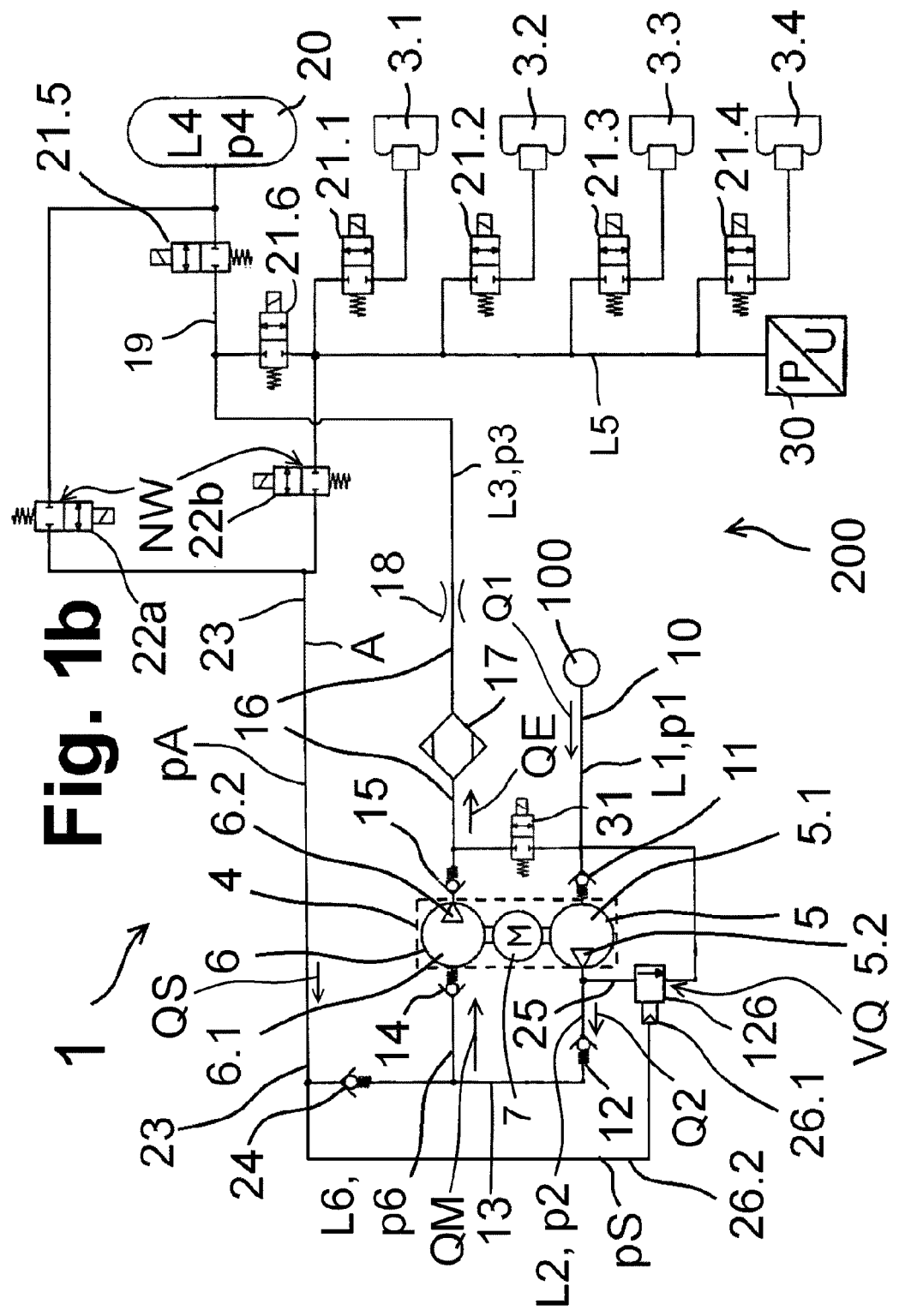
Figure 1C:
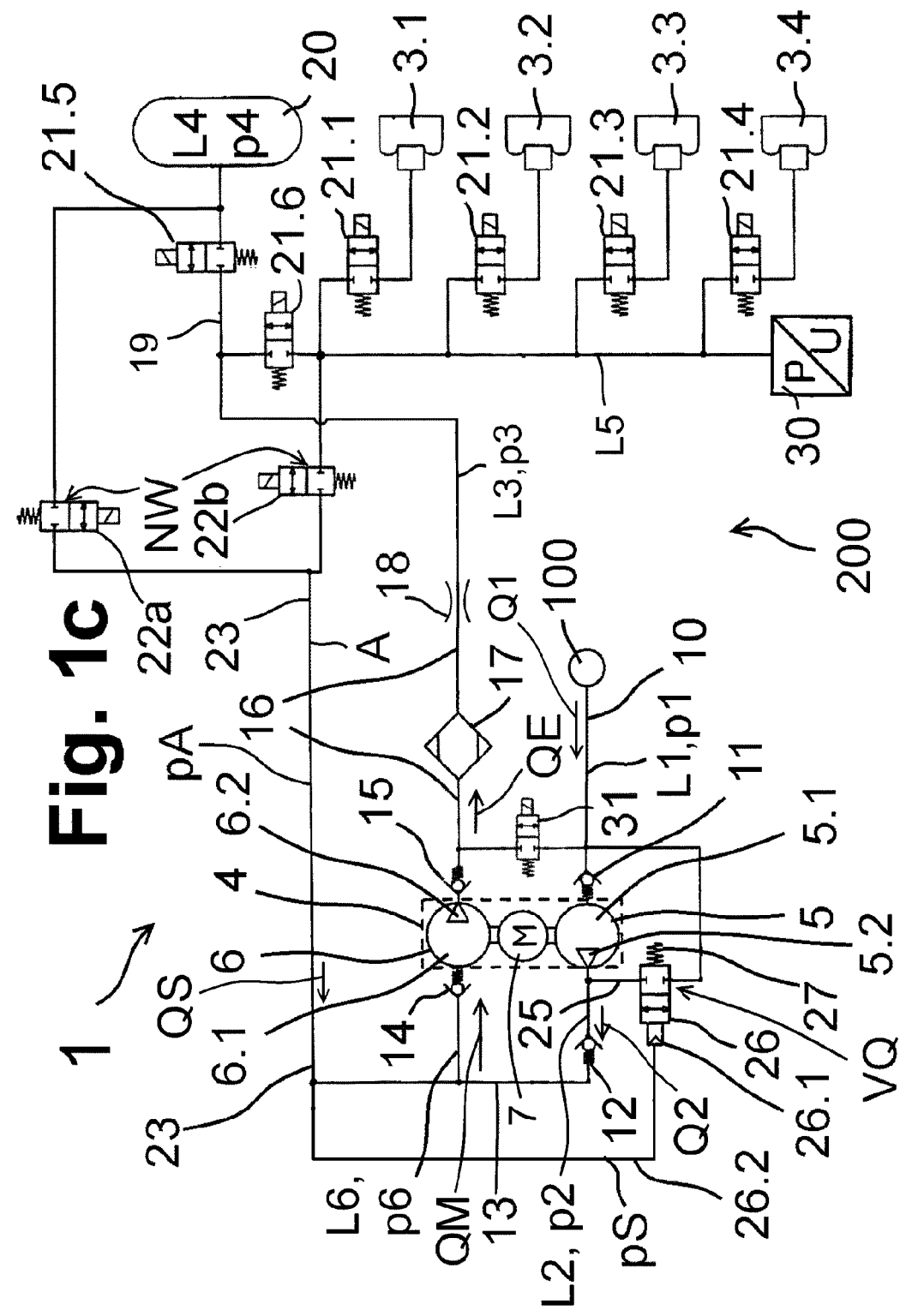

Here, the opening pressure p0 may be selected such that the additional valve 24, which in the open operating mode BMo prevents the shut-off valve 26 from opening already owing to the pre-compressed pressure medium L2, can be omitted, as shown in the embodiment in FIG. 1c. For this purpose, the opening pressure p0 must be selected to be higher than a maximum attainable intermediate pressure p2max that is to be attained by means of the first compression stage 5. Furthermore, a minimum charging pressure pAmin of the charging pressure medium A must be taken into consideration, such that, in the open operating mode BMo, an inadvertent opening of the shut-off valve 26, and in the closed operating mode BMc, an ensured opening of the shut-off valve 26, and thus a power reduction, can be ensured. The entire air spring system 1 or the multi-stage compressor 4 must in this case be correspondingly adapted to said opening pressure p0 of the shut-off valve 26, such that, in particular, the minimum charging pressure pAmin and the maximum intermediate pressure p2max can be correspondingly set.

Thus, either by means of the opening pressure p0 and/or by means of the additional valve 24, a shut-off function can be generated, which in each case prevent the pressure medium L2 pre-compressed by the first compression stage 5 from switching over the shut-off valve 26 in the open operating mode BMo.

The degree to which, or up to what limit pressure pG, or up to what limit volume flow QG, the shut-off valve 26 conveys the pre-compressed air L2 from the first compression space 5.2 into the intermediate volume 13 is dependent on the design of the shut-off valve 26, in particular on a valve cross section VQ. Here, it is firstly possible, in the case of a large valve cross section VQ of for example 1 mm, to achieve a complete deactivation of the first compression stage 5, in the case of which the pre-compressed air L2 is, in the case of an opened shut-off valve 26, discharged completely via the latter into the ventilation line 25 and therefore no conveyance into the intermediate volume 13 takes place, that is to say the limit pressure pG amounts to 0 bar absolute or the limit volume flow QG is set to a throughflow rate of zero. On the other hand, provision may be made whereby, in the case of a small valve cross section VQ of for example 0.8 mm and an opened shut-off valve 26, only a set proportion of the pre-compressed air L2 can escape into the ventilation line 25, and the remaining proportion is conveyed by the first compression stage 5 into the intermediate volume 13. In this case, the first compression stage 5 thus partially still contributes to the overall compression power of the compressor 4.

If, for the first compression stage 5, in the closed operating mode BMc, only a reduction of the compression power to greater than zero is provided, that is to say the first compression stage 5 introduces a pre-compressed pressure medium L2 with an intermediate volume flow Q2 into the intermediate volume 13, then a mixed pressure medium L6 is situated in the intermediate volume 13, in which mixed pressure medium the charging pressure medium A and the pre-compressed pressure medium L2 are present in certain proportions. The mixed pressure medium L6 is conveyed with a mixed pressure p6 and a mixed volume flow QM, which are defined by the respective pressures pA, p2 or volume flows QS, Q2 of the charging pressure medium A and of the pre-compressed pressure medium L2 respectively, into the second compression stage 6.

If, however, the first compression stage 5 is completely deactivated in the closed operating mode BMc, only the charging pressure medium A with the charging pressure pA and the store volume flow QS is introduced from the intermediate volume 13 into the second compression stage 6. The mixed pressure medium L6 is thus composed exclusively of the charging pressure medium A with the charging pressure pA without a proportion of pre-compressed air L2 from the first compression stage 5.

By contrast, in the open operating mode BMo, only the pre-compressed air L2 with the intermediate pressure p2 and the intermediate volume flow Q2 is conveyed through the intermediate volume 13 into the second compression stage 6, without mixing with the charging pressure medium A occurring. The mixed pressure medium L6 is thus composed exclusively of the pre-compressed air L2 with the intermediate pressure p2 and the intermediate volume flow Q2.

Alternatively, the shut-off valve 26 as per FIG. 1b may also be formed as a 2/2 proportional valve 126 which, depending on the prevailing control pressure pS and valve cross section VQ at the pneumatic control input 26.1, discharges only a proportion of the pre-compressed air L2 into the ventilation line 25—without additional valve 24 only when the opening pressure p0 has been reached—and it is thus possible to variably set the degree to which the compression power of the first compression stage 5 is restricted in the closed operating mode BMc.

In this way, in the closed operating mode BMc, a power limitation can be achieved, by means of which the energy requirement of the compressor 4 can be variably adapted or minimized, because a pre-compression of the intake air L1 to the charging pressure pA prevailing in the intermediate volume 13 in this case is prevented. The required power consumption of the motor 7 of the compressor 4 is thus limited, because the amount of compression work that the first piston 8 has to perform is less. This may be utilized for optimizing the second compression stage 6, such that an optimum coordination in particular of a final volume flow QE of the second compression stage 6, of an upper energy limit of of the compressor 4 and of a piston diameter D2 of the second compression stage 6 is possible.

Figure 2:
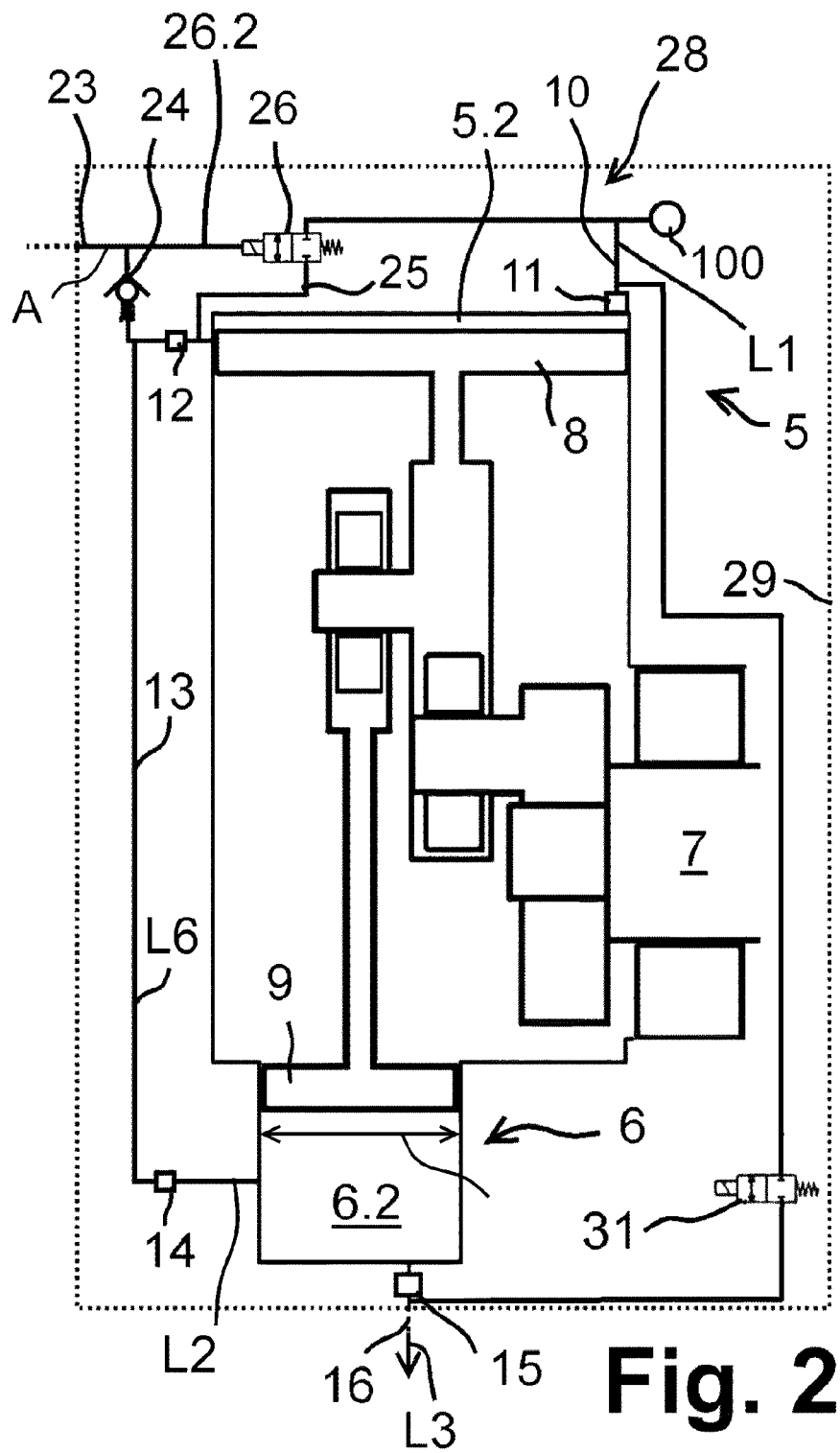
FIG. 2 shows a two-stage compressor with an integrated pressure-controlled shut-off valve according to a first embodiment.

FIG. 2 illustrates the multi-stage piston compressor 4 with the first and the second compression stages 5, 6 in a schematic view, which corresponds to the embodiment illustrated in FIG. 1a with an additional valve 24 and a pneumatic 2/2 directional valve as shut-off valve 26. The two compression stages 5, 6 are connected to one another via the intermediate volume 13, such that the air L2 pre-compressed in the first compression stage 5 by means of the first piston 8 can, in particular in the open operating mode BMo, be conveyed into the second compression stage 6 in order to be compressed further there by the second piston 9.

In the closed operating mode BMc, the charging pressure medium A is conducted via the store line 23 into the intermediate volume 13 and via the control line 26.2 to the control input 26.1 of the shut-off valve 26. The pneumatic shut-off valve 26, the associated transmission lines 23, 26.2, the additional valve 24 and the ventilation line 25 may be arranged in space-saving fashion for example in the compressor cover 28 of the compressor casing 29.

Figure 3:
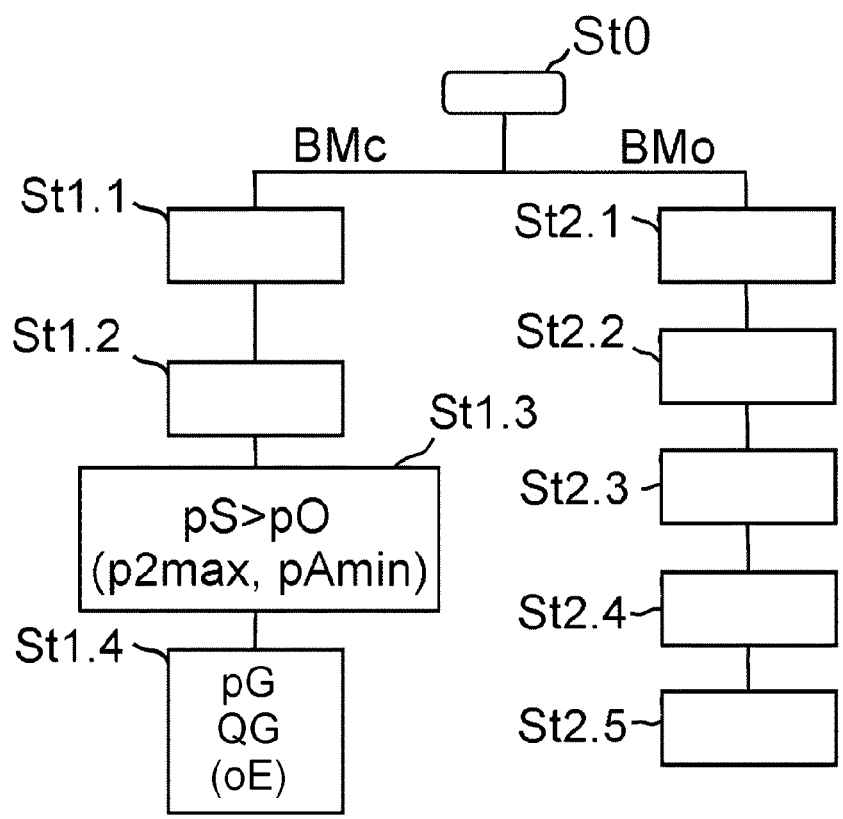
FIG. 3 shows a flow diagram for the execution of a method according to an embodiment of the invention.

As per FIG. 3, a method according to an embodiment of the invention for operating the air spring system in the closed operating mode BMc may be carried out as follows:

In an initial step St0, it is checked which operating mode BMo, BMc of the pressure control system is set.

If the closed operating mode BMc of the pressure control system 1 is set, the charging pressure medium A is, in a first step St1.1, released by means of the respective switching valve 22a, 22b and admitted via the store line 23 into the intermediate volume 13, from which said charging pressure medium is compressed again by means of the second compression stage 6. An inflow into the first compression stage 5 is prevented by means of the outlet valve 12.

At the same time, in a second step St1.2, the charging pressure medium A passes via the control line 26.2 to the control input 26.1 of the shut-off valve 26. Subsequently, in a third step St1.3, the shut-off valve 26 is switched over in a manner dependent on the control pressure pS prevailing at the control input 26.1 if the control pressure pS is higher than the opening pressure p0. Here, the opening pressure p0 may be selected such that the additional valve 24, which in the open operating mode BMo prevents the shut-off valve 26 from opening already owing to the pre-compressed pressure medium L2, can be omitted. For this purpose, the opening pressure p0 must be selected to be higher than a maximum attainable intermediate pressure p2max that is to be attained by means of the first compression stage 5. Furthermore, a minimum charging pressure pAmin of the charging pressure medium A must be taken into consideration, such that, in the open operating mode BMo, an inadvertent opening of the shut-off valve 26, and in the closed operating mode BMc, an ensured opening of the shut-off valve 26, and thus a power reduction, can be ensured.

In this way, in a fourth step St1.4, the pressure medium L2 pre-compressed by the first compression stage 5 is diverted at least proportionally into the intake line 10 or the atmosphere 100. In this way, the pre-compressed pressure medium L2 is conveyed only to a certain extent into the intermediate volume 13, and thus the compression power of the first compression stage 5 is limited, by virtue of the intermediate pressure p2 being restricted to the limit pressure pG and/or the intermediate volume flow Q2 being restricted to the limit volume flow QG. If a complete deactivation of the first compression stage 5 is desired, then it is the case, with corresponding design of the valve cross section VQ of the shut-off valve 26, that no pre-compressed pressure medium L2 passes from the first compression stage 5 into the intermediate volume 13, and the power consumption of the first compression stage 5 is limited to friction losses, and therefore pG and Q2 are approximately zero. This gain in energy can be used for optimally coordinating the second compression stage 6.

The limitation of the compression power in the fourth step St1.4 may in this case for example also be implemented in a manner dependent on an upper energy limit oE, such that, in the event of the upper energy limit oE being overshot, a greater proportion of the compressed pressure medium L2 is discharged into the ventilation line 25, such that the power consumption of the first compression stage 5 and therefore also the energy consumption of the compressor 4 decrease.

In the open operating mode BMo, in a step St2.1, the intake air L1 passes from the atmosphere 100 into the first compression stage 5. In the first compression stage 5, the intake air L1 is, in a second step St2.2, pre-compressed to the intermediate pressure p2, and in a third step St2.3, admitted into the intermediate volume 13. From the intermediate volume 13, the pre-compressed pressure medium L2 passes into the second compression stage 6, in which, in a fourth step St2.4, a renewed compression to the final pressure p3 takes place. In a final step St2.5, the pre-compressed pressure medium L3 passes into the pressure medium chambers 3.i or the pressure medium reservoir 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Air suspension system
3.i Pressure medium chambers
4 Two-stage compressor
5 First compression stage
5.1 First intake space
5.2 First compression space
6 Second compression stage
6.1 Second intake space
6.2 Second compression space
7 Motor
8 First piston of the first compression stage
9 Second piston of the second compression stage
10 Intake line
11 First inlet valve
12 First outlet valve
13 Intermediate volume
14 Second inlet valve
15 Second outlet valve
16 Outlet line
17 Air dryer
18 Nozzle
19 Reservoir line
20 Pressure medium reservoir
21.i Controllable valves
22a First switching valve
22b Second switching valve
23 Store line
24 Additional valve
25 Ventilation line
26 Shut-off valve (directional valve)
26.1 Control input
26.2 Control line
27 Spring
28 Compressor cover
29 Compressor casing
30 Pressure measuring unit
31 Discharge valve
100 Atmosphere
126 Shut-off valve (proportional valve)
200 Vehicle
A Charging pressure medium
BMo Open operating mode
BMc Closed operating mode
L1 Intake air
L2 Pre-compressed air
L3 Compressed air
L4 Stored air
L5 Chamber air
L6 Mixed pressure medium
oE Upper energy limit
NW Nominal diameter
pA Charging pressure
pAmin Minimum charging pressure
p1 Air pressure/intake pressure
p2 Intermediate pressure
p2max Maximum intermediate pressure
p3 Final pressure
p4 Reservoir pressure
p6 Mixed pressure
pG Limit pressure
p0 Opening pressure
pS Control pressure
VQ Valve cross section
Q1 Intake volume flow
Q2 Intermediate volume flow
QE Final volume flow
QG Limit volume flow
QS Store volume flow
QM Mixed volume flow
St1.1, St1.2, St1.3, St1.4 Steps of the method in BMc
St2.1, St2.2, St2.3, St2.4, St2.5 Steps of the method in BMo

The invention claimed is:

1. A method for operating a pressure control system having a multi-stage compressor, the method comprising:

providing a multiply compressed pressure medium by the multi-stage compressor for filling a pressure medium reservoir or pressure medium chambers of the pressure control system, wherein providing the multiply compressed pressure medium includes:
providing, by a first compression stage, a pre-compressed charging pressure medium and additionally compressing, at least by a second compression stage, the pre-compressed pressure medium, and/or
introducing an already-compressed charging pressure medium into an intermediate volume between the first compression stage and the second compression stage of the multi-stage compressor and further compressing the charging pressure medium at least by the second compression stage,
wherein the charging pressure medium simultaneously passes via a control line to a control input of a shut-off valve that interacts with the first compression stage, such that a charging pressure of the charging pressure medium predefines a control pressure of the shut-off valve, and
wherein, by the shut-off valve, a pressure limitation and/or volume flow limitation, dependent on the control pressure, of the pre-compressed pressure medium conveyed by the first compression stage into the intermediate volume is realized for the purposes of automatically adapting the compression power of the first compression stage by the charging pressure medium situated in the control line.

2. The method as claimed in claim 1, wherein the pre-compressed pressure medium is at least proportionally diverted by the shut-off valve into a ventilation line in order to generate the pressure limitation and/or the volume flow limitation of the pre-compressed pressure medium conveyed by the first compression stage.

3. The method as claimed in claim 2, wherein a fraction of the pre-compressed pressure medium that is diverted by the shut-off valve into the ventilation line is set in continuously variable fashion in a manner dependent on the control pressure.

4. The method as claimed in claim 2, wherein, in the case of a proportional diversion of the pre-compressed pressure medium into the ventilation line, a pressure-limited and/or volume-flow-limited pre-compressed pressure medium passes out of the first compression stage and at the same time the charging pressure medium passes into the intermediate volume, such that a mixed pressure medium composed of the charging pressure medium and the pre-compressed pressure medium is situated in the intermediate volume, and the multi-stage compressor thus provides a pressure medium which has been compressed by the second compression stage and which is obtained both from a compression of the charging pressure medium and from a compression of the pressure-limited and/or volume-flow-limited pre-compressed pressure medium from the first compression stage.

5. The method as claimed in claim 2, wherein a fraction of the pre-compressed pressure medium discharged by the shut-off valve into the ventilation line is furthermore set in a manner dependent on an upper energy limit of the multi-stage compressor, wherein, in the event of the upper energy limit being overshot, the fraction of discharged pre-compressed pressure medium is increased.

6. The method as claimed in claim 2, wherein the shut-off valve is either fully opened or fully closed in a manner dependent on the control pressure.

7. The method as claimed in claim 6, wherein the pre-compressed pressure medium is, in the case of a fully opened shut-off valve, discharged entirely into the ventilation line, such that no pre-compressed pressure medium passes from the first compression stage into the intermediate volume, wherein the first compression stage is thus deactivated, and the multi-stage compressor thus provides a multiply compressed pressure medium which is obtained exclusively from a compression of the charging pressure medium in the second compression stage, in order to reduce the energy consumption of the compressor.

8. The method as claimed in claim 1, wherein the charging pressure medium is admitted into the store line by opening of a controllable switching valve, wherein the charging pressure medium, in the event of the switching valve being opened, is conducted both into the intermediate volume and to the control input of the shut-off valve.

9. A pressure control system, comprising:
a multi-stage compressor with a first compression stage for providing a pre-compressed pressure medium and with at least one second compression stage for providing a compressed pressure medium, wherein the first compression stage and the second compression stage are connected to one another via an intermediate volume configured to convey the pre-compressed pressure medium into the second compression stage,
at least one pressure medium chamber connected to the second compression stage;
a pressure medium reservoir connected to the second compression stage and configured to store the compressed pressure medium;
a store line that connects the pressure medium reservoir or the at least one pressure medium chamber to the intermediate volume for the purposes of operating the pressure control system with pressure medium stored in the pressure medium reservoir or for the purposes of returning a chamber pressure medium used in the pressure medium chambers into the pressure medium reservoir, and
a shut-off valve, wherein the shut-off valve is configured to interact with the first compression stage such that, in a manner dependent on the actuation of the shut-off valve, a pressure limitation and/or a volume flow limitation of the pre-compressed pressure medium conveyed by the first compression stage into the intermediate volume can be achieved for the purposes of adapting a compression power of the first compression stage; and
a control line to a pneumatic control input of the shut-off valve that branches off from the store line such that the stored pressure medium or the chamber pressure medium can be fed as charging pressure medium to the intermediate volume and simultaneously via the control line to the control input of the shut-off valve as control pressure for the purposes of self-regulating pneumatic actuation of the shut-off valve by the charging pressure medium situated in the control line,
wherein a shut-off function is provided that prevents the pressure medium pre-compressed by the first compression stage from switching, via the intermediate volume and the control line, the shut-off valve for the pressure limitation and/or the volume flow limitation.

10. The pressure control system as claimed in claim 9, wherein a ventilation line that branches off from the first compression stage is arranged such that the pressure medium pre-compressed by the first compression stage can, in a manner dependent on the control pressure, be at least proportionally diverted via the ventilation line into an intake line or an atmosphere for the purposes of pressure limitation and/or volume flow limitation of the pre-compressed pressure medium conveyed by the first compression stage into the intermediate volume.

11. The pressure control system as claimed in claim 10, wherein the ventilation line branches off between a first outlet valve and a first compression space of the first compression stage.

12. The pressure control system as claimed in claim 10, wherein the ventilation line opens into an intake line or an atmosphere for the purposes of discharging the pre-compressed pressure medium into the intake line or the atmosphere.

13. The pressure control system as claimed in claim 9, wherein the shut-off function is ensured by an overpressure valve arranged between the intermediate volume and the shut-off valve.

14. The pressure control system as claimed in claim 9, wherein the shut-off function is formed by an opening pressure of the shut-off valve, wherein the opening pressure indicates the pressure above which the shut-off valve moves into an at least partially opened position,
wherein the opening pressure is higher than a maximum intermediate pressure of the pressure medium pre-compressed by the first compression stage and lower than or equal to a minimum charging pressure of the charging pressure medium, and
wherein the maximum intermediate pressure and the minimum charging pressure are coordinated with one another through corresponding configuration of the multi-stage compressor.

15. The pressure control system as claimed in claim 9, wherein a first controllable switching valve is provided in the store line for the purposes of releasing the stored pressure medium as charging pressure medium and a second controllable switching valve is provided for the purposes of releasing the chamber pressure medium as charging pressure medium, wherein the released charging pressure medium passes from the store line into the intermediate volume and to the control input of the shut-off valve.

16. The pressure control system as claimed in claim 15, wherein a nominal diameter of the switching valves amounts to between 1 mm and 4 mm for the purposes of increasing a store volume flow into the first intermediate volume and a final volume flow out of the second compression stage.

17. The pressure control system as claimed in claim 9, wherein the shut-off valve is configured as a pneumatic directional valve with a spring for the purposes of stepped pressure limitation and/or volume flow limitation of the pre-compressed pressure medium.

18. The pressure control system as claimed in claim 9, wherein the shut-off valve is designed as a pneumatic proportional valve for the purposes of continuously variable pressure limitation and/or volume flow limitation of the pre-compressed pressure medium.

19. The pressure control system as claimed in claim 9, wherein the shut-off valve and components of the shut-off function are integrated in a compressor casing of the multi-stage compressor.

20. The pressure control system as claimed in claim 9, wherein the pressure control system is an air suspension system in a vehicle.

21. A vehicle having a pressure control system as claimed in claim 9.

* * * * *